US 8,351,091 B2

(12) United States Patent
Kojima (10) Patent No.: US 8,351,091 B2
(45) Date of Patent: Jan. 8, 2013

(54) IMAGE PROCESSING SYSTEM AND IMAGE SCANNER THEREFOR (75) Inventor: Atsushi Kojima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 622 days.

(21) Appl. No.: 12/558,953

(22) Filed: Sep. 14, 2009

(65) Prior Publication Data
US 2010/0073740 A1 Mar. 25, 2010

(30) Foreign Application Priority Data

Sep. 24, 2008 (JP) ................................ 2008-244465

(51) Int. Cl.
H04N 1/04 (2006.01)
G06F 15/00 (2006.01)
(52) U.S. Cl. ...................................... 358/474; 358/1.15
(58) Field of Classification Search .......................... None
See application file for complete search history.

(56) References Cited

U.S. PATENT DOCUMENTS

| 2004/0117637 | A1 | 6/2004 | Kanno |
| 2004/0190078 | A1* | 9/2004 | Lebo et al. ................ 358/474 |
| 2005/0141026 | A1 | 6/2005 | Fujino |
| 2006/0031674 | A1* | 2/2006 | Sakurai .................... 713/166 |
| 2006/0171726 | A1 | 8/2006 | Noda et al. |
| 2009/0185243 | A1 | 7/2009 | Mizutani |

FOREIGN PATENT DOCUMENTS

| EP | 0 706 283 | | 4/1996 |
| JP | 2004-266559 | | 9/2004 |
| JP | 2005-192022 | | 7/2005 |
| JP | 2006-165750 | | 6/2006 |
| JP | 2006-319724 | | 11/2006 |
| JP | 2007-068015 | | 3/2007 |
| JP | 2008-187521 | | 8/2008 |
| JP | 2008187521 A | * | 8/2008 |

OTHER PUBLICATIONS

Notification of Reasons for Rejection received for corresponding Japanese Application No. 2008-244465 mailed Sep. 7, 2010.
Notification of First Office Action for Chinese Patent Application No. 200910178515.X mailed Jan. 11, 2011.
European Search Report corresponding to Application No. 09252032.9 dated Jul. 9, 2010.

* cited by examiner

Primary Examiner — Thierry Pham
(74) Attorney, Agent, or Firm — Banner & Witcoff, Ltd.

(57) ABSTRACT

An image processing system includes an information processing device configured to externally receive image data and display thereon an image based on the image data, and an image scanner connected with the image processing device. The image scanner includes a scanning unit configured to scan an image on a document set thereon and to create image data of the scanned image, a detector configured to detect whether the document is removed from the scanning unit, and a controller configured to, in response to the detector detecting that the document is removed from the scanning unit after the image on the document is scanned by the scanning unit, transmit the image data created by the scanning unit to the information processing device.

13 Claims, 6 Drawing Sheets

PLEASE OPEN THE COVER AND REMOVE
THE DOCUMENT AFTER IMAGE SCANNING.
IMAGE DATA WILL BE SENT TO PC WHEN
THE COVER IS OPENED.

FIG.4A

PLEASE BE CAREFUL NOT TO LEAVE
THE DOCUMENT BEHIND.

THE DOCUMENT REMAINS SET ON THE SCANNER.

PLEASE INPUT A PASSWORD TO DISPLAY
THE IMAGE DATA SCANNED.

PASSWORD

IMAGE PROCESSING SYSTEM AND IMAGE SCANNER THEREFOR

CROSS-REFERENCE TO RELATED APPLICATION

This application claims priority under 35 U.S.C. §119 from Japanese Patent Application No. 2008-244465 filed on Sep. 24, 2008. The entire subject matter of the application is incorporated herein by reference.

BACKGROUND

1. Technical Field

The following description relates to one or more image processing systems and image scanners for scanning an image on a document and displaying the scanned image.

2. Related Art

A system has been known which is configured to transmit or receive data such as scanned image data between a personal computer (hereinafter referred to as a PC) and a Multi-Function Peripheral (MFP) connected with each other via a LAN. Japanese Patent Provisional Publication No. 2005-192022 discloses a pull scan function and a push scan function. In the pull scan function, a user issues an instruction to perform image scanning to the MFP from the PC, and image data created through the image scanning by the MFP is received by the PC. Meanwhile, in the push scan function, the user issues an instruction to perform image scanning directly to the MFP, and image data created through the image scanning by the MFP is transmitted to the PC via the LAN.

SUMMARY

However, for instance, in the aforementioned system to achieve the push scan function and the pull scan function, when an image on a document is scanned at the side of the MFP (an image scanner), the image data scanned is automatically transmitted to the PC. In such a situation, the user may begin to edit or save the image data at the side of the PC without being aware of the document left behind at the MFP 10. Therefore, there is a problem that the document left behind at the MFP 10 might keep a different user from using the image scanner or that confidential information contained in the document might leak to a third party including the different user who takes a look at the document.

Aspects of the present invention are advantageous to provide one or more improved image processing systems and image scanners therefor that make it possible to prevent a document from being left behind.

According to aspects of the present invention, an image processing system is provided, which includes an information processing device configured to externally receive image data and display thereon an image based on the image data, and an image scanner connected with the image processing device. The image scanner includes a scanning unit configured to scan an image on a document set thereon and to create image data of the scanned image, a detector configured to detect whether the document is removed from the scanning unit, and a controller configured to, in response to the detector detecting that the document is removed from the scanning unit after the image on the document is scanned by the scanning unit, transmit the image data created by the scanning unit to the information processing device.

According to aspects of the present invention, further provided is an image scanner connectable with an image processing device. The image scanner includes a scanning unit configured to scan an image on a document set thereon and to create image data of the scanned image, a detector configured to detect whether the document is removed from the scanning unit, and a controller configured to, in response to the detector detecting that the document is removed from the scanning unit after the image on the document is scanned by the scanning unit, transmit the image data created by the scanning unit to the information processing device.

According to aspects of the present invention, further provided is an image scanner connectable with an image processing device. The image scanner includes a scanning unit configured to scan an image on a document set thereon and to create image data of the scanned image, a detector configured to detect whether the document remains on the scanning unit, and a controller configured to, while the detector is detecting that the document remains on the scanning unit even after the image on the document is scanned by the scanning unit, forbid transmitting the image data created by the scanning unit to the information processing device.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

<Overall Configuration>

Figure 1:
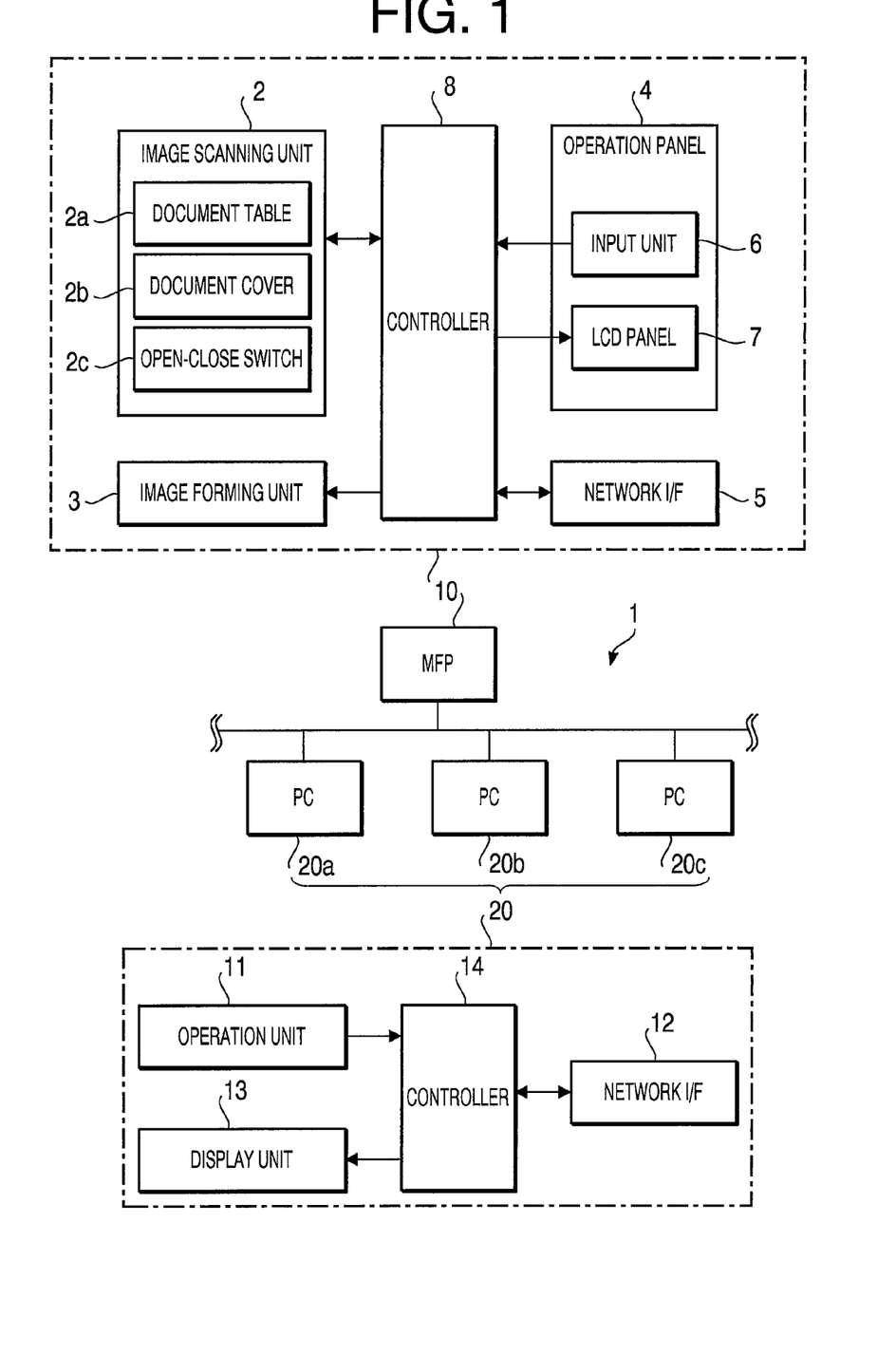
FIG. 1 is a block diagram schematically showing a configuration of an image processing system in an embodiment according to one or more aspects of the present invention.

Hereinafter, an embodiment according to aspects of the present invention will be described with reference to the accompany drawings. FIG. 1 is a block diagram schematically showing a configuration of an image processing system 1 in an embodiment according to aspects of the present invention. As illustrated in FIG. 1, the image processing system 1 includes a Multi-Function Peripheral (MFP) 10 with a scanner function and a plurality of Personal Computers (PCs) 20a to 20c connected with the MFP 10 via a network. It is noted that, hereinafter, one of the PCs 20a to 20c will be referred to as the PC 20 as a representative for the sake of explanatory convenience. Further, in the embodiment, the configuration of the image processing system 1 that includes a single MFP 10 and a plurality of PCs 20 is shown, but a plurality of MFPs 10 may be connected with the network, or a single PC 20 may be connected with the network.

<Configuration of MFP>

Subsequently, a configuration of the MFP 10 in the embodiment according to aspects of the present invention will be set forth. It is noted that the MFP 10 is configured with multiple functions such as a printer function, a copy function, and a facsimile function, as well as the scanner function.

The MFP 10 includes an image scanning unit 2 configured to create image data by scanning an image on a document sheet, an image forming unit 3 configured to form an image on a print medium such as a sheet, an operation panel 4 configured to accept an input of a user operation and to display various screen images, and a network I/F 5 configured with a connector to input and output information on an image and various commands via a network such as a LAN.

The image scanning unit 2 is provided with a known flatbed mechanism, which includes a document table 2a configured to be loaded with a document sheet to be scanned, a document cover 2b configured to protect the document table 2a from being exposed to external light, and an open-close switch 2c configured to detect an opened state and a closed state of the document cover 2b. Further, the image scanning unit 2 is configured to scan an image on a document sheet placed on the document table 2a. The open-close switch 2c is, for instance, provided to protrude from a top surface of the document table 2a. When the document cover 2b is in the closed state, the open-close switch 2c is pushed down and set ON. Meanwhile, when the document cover 2b is in the opened state, the open-close switch 2c is set OFF with the pushing power applied thereto being released.

The operation panel 4 has an input unit 6 configured to accept an input operation for various settings or commands, a menu screen configured to show various menu items, and a liquid crystal display (LCD) panel 7 configured to display information on a user input or an error. The input unit 6 includes a touch panel configured integrally with a display surface of the LCD panel 7 and mechanical key switches (key switch group) provided around the LCD panel 7. Further, at least one of the touch panel and the key switch group is provided with an operation member such as an operation button for accepting a start operation to start image scanning or a lock operation to restrict displaying scanned image on the PC 20. It is noted that the scanned image means an image to be displayed on the PC 20 based on image data which is created by the image scanning unit 2 and input to the PC 20.

In addition, the MFP 10 is provided with a controller 8, which achieves the printer function, the scanner function, the copy function, and the facsimile function by controlling each element (such as the image scanning unit 2, the image forming unit 3, and the network I/F 5, and the LCD panel 7) in accordance with operations and/or commands input through the input unit 6 and/or the network I/F 5, acquiring image data created by the image scanning unit 2, and performing data communication to send or receive information on an image via a public line.

The controller 8 is configured mainly with a known microcomputer, which has a CPU, a ROM, a RAM, and an I/O interconnected via a bus line. The aforementioned CPU performs a below-mentioned MFP-side scanning process based on a program stored on the ROM, with the RAM as a work area. Further, the RAM has an output buffer to temporarily store image data created by the image scanning unit 2.

<MFP-Side Scanning Process>

Figure 2:
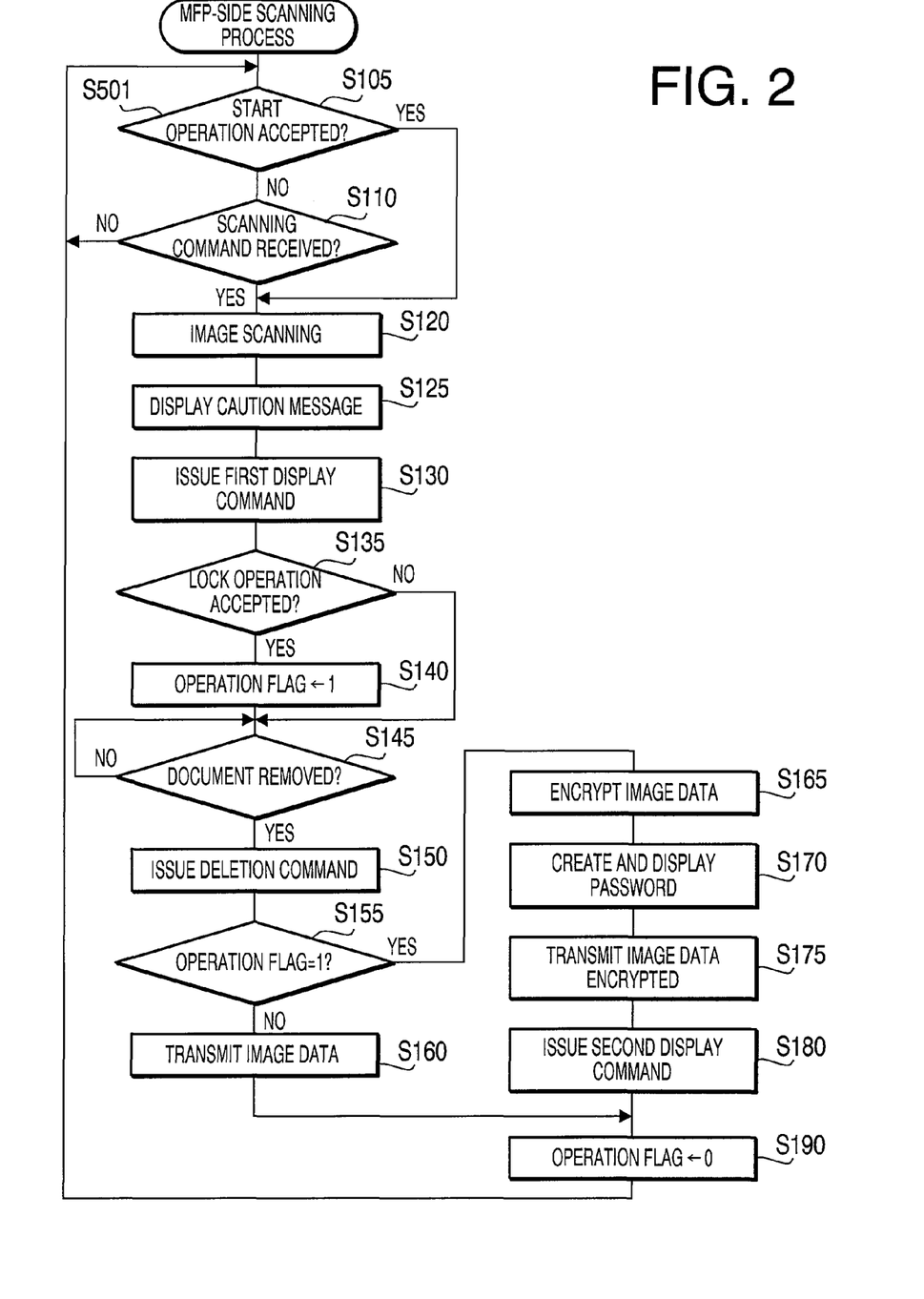
FIG. 2 is a flowchart showing a detailed procedure of an MFP-side scanning process to be executed by a controller of a Multi-Function Peripheral (MFP) in the embodiment according to one or more aspects of the present invention.

FIG. 2 is a flowchart showing a detailed procedure of an MFP-side scanning process to be executed by the controller 8 (more specifically, by the CPU of the controller 8). It is noted that, when a power supply of the MFP 10 is set ON, the process is launched and repeatedly performed.

As illustrated in FIG. 2, when the process is launched, the controller 8 first determines in S105 whether a start operation to start image scanning is accepted through the input unit 6 (S105). When the start operation to start image scanning is accepted through the input unit 6 (S105: Yes), the controller 8 goes to S120. Meanwhile, when the operation to start scanning is not accepted through the input unit 6 (S105: No), the controller 8 proceeds to S110.

In S110, the controller determines whether a below-mentioned scanning command is received from the PC 20 through the network I/F 5 (S110). When the scanning command is received from the PC 20 through the network I/F 5 (S110: Yes), the controller 8 advances to S120. Meanwhile, when the scanning command is not received from the PC 20 through the network I/F 5 (S110: No), the controller 8 goes back to S105.

In S120, the controller 8 causes the image scanning unit 2 to start image scanning (S120). It is noted that, in the embodiment, when the open-close switch 2c is set ON, namely, when the document cover 2b is in the closed state, the image scanning is started. Further, image data created by the image scanning unit 2 is temporarily stored on the output buffer of the RAM.

Figure 4A:
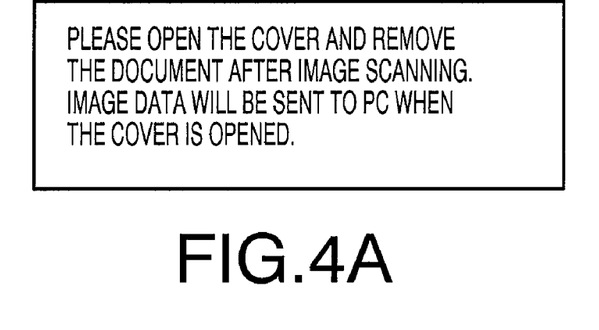
FIG. 4A exemplifies a caution message (an MFP-side message) displayed at the side of the MFP in the embodiment according to one or more aspects of the present invention.

In a subsequent step S125, as illustrated in FIG. 4A, the controller 8 displays on the LCD panel 7 of the MFP 10 a caution message to call user's attention for preventing a document from being left behind on the document table 2a (hereinafter referred to as an MFP-side message) (S125), and then proceeds to S130. The MFP-side message may be deleted after a lapse of a predetermined period of time or in response to a user operation for confirmation accepted through the input unit 6. Alternatively, the MFP-side message may be deleted when the document is removed from the document table 2a.

In S130, the controller 8 issues, to the PC 20 via the network I/F 5, a first display command to make the PC 20 display a caution message to call user's attention for preventing the document from being left behind on the document table 2a (hereinafter referred to as a PC-side message) (S130).

In a subsequent step S135, the controller 8 determines whether the lock operation is accepted through the input unit 6 (S135). When the lock operation is accepted through the input unit 6 (S135: Yes), the controller 8 advances to S140. Meanwhile, when the lock operation is not accepted through the input unit 6 (S135: No), the controller 8 goes to S145. In S140, the controller sets an operation flag that represents whether the lock operation is accepted in S135 to "1" that represents that the lock operation is accepted (S140).

In S145, the controller 8 determines whether the open-close switch 2c is in the OFF state (S145). When the open-close switch 2c is in the OFF state, namely, when the document cover 2b is in the opened state (S145: Yes), the controller 8 determines that the document is removed from the document table 2a, and advances to S150. Meanwhile, when the open-close switch 2c is in the ON state, namely, when the document cover 2b is in the closed state (S145: No), the controller 8 determines that the document is placed on the document table 2a, and waits the open-close switch 2c to be set to the OFF state.

In S150, the controller 8 issues, to the PC 20 via the network I/F 5, a deletion command to make the PC 20 delete the PC-side message (S150). In S155, the controller 8 determines whether the operation flag is set to "1" (S155). When the operation flag is set to "1," namely, when the lock operation is accepted in S135 (S155: Yes), the controller 5 goes to S165. Meanwhile, when the operation flag is not set to "1," namely, when the lock operation is not accepted in S135 (S155: No), the controller 5 proceeds to S160.

In S160, the controller 8 transmits the image data stored on the output buffer of the RAM to the PC 20 via the network I/F 5, and goes to S190 (S160). It is noted that the image data is deleted from the output buffer of the RAM after being transmitted to the PC 20.

Meanwhile, in S165, the controller 8 encrypts the image data stored on the output buffer of the RAM, and temporarily the encrypted image data on the output buffer of the RAM in an overwriting manner (S165). Then, the controller 8 proceeds to S170. It is noted that the encrypted image data is data scrambled, into which the image data is converted such that the scrambled state thereof can be released with a below-mentioned password.

In S170, the controller 8 creates a password for decrypting the image data encrypted in S165 at random within a predetermined number of characters, and displays the created password on the LCD panel 7 (S170). It is noted that the password may be deleted after a lapse of a predetermined period of time or in response to a user operation for confirmation accepted through the input unit 6.

In a subsequent step S175, the controller 8 transmits, to the PC 20 via the network I/F 5, the image data encrypted in S165 and the password created in S170 (S175). Then, the controller 8 advances to S180.

In S180, the controller 8 issues, to the PC 20 via the network I/F 5, a second display command to make the PC 20 display an input screen for inputting therethrough the password created in S170 (S180). Then, the controller 8 goes to S190, in which the operation flag is set back to "0" representing that the lock operation is not accepted. Thereafter, the controller 8 goes back to S105.

<Configuration of PC>

Referring back to FIG. 1, the PC 20 includes an operation unit 11 configured to accept an input of information required for operating the PC 20 via a mouse or a keyboard, a network I/F 12 configured with a connector to input and output information on an image and various commands via a network such as a LAN, a display unit 13 configured to display various kinds of information, and a controller 14 configured to control the network I/F 12 and the display unit 13 based on input information received via the operation unit 11 or the network I/F 12.

The display unit 13 is provided with a known display device such as an LCD device, on which an image, such as a User Interface (UI) screen through which various kinds of information is input and a mouse pointer, is displayed with a known Graphical User Interface (GUI) function that a personal computer has.

The controller 14 is configured mainly with a known microcomputer, which has a CPU, a ROM, a RAM, an HDD, and an I/O interconnected via a bus line. The CPU performs various processes such as creation and edit of a text and an image based on programs stored on the ROM, and an OS and various applications loaded on the RAM.

The ROM has an OS having a multitask function installed thereon, and the various applications are adapted to work under an environment of the OS. The HDD has an application installed thereon, which is an application to display, process (edit), and save an image (image data) scanned by the MFP 10 (hereinafter referred to as an image processing application). The CPU performs a below-mentioned PC-side scanning process based on the image processing application loaded on the RAM.

<PC-Side Scanning Process>

Figure 3:
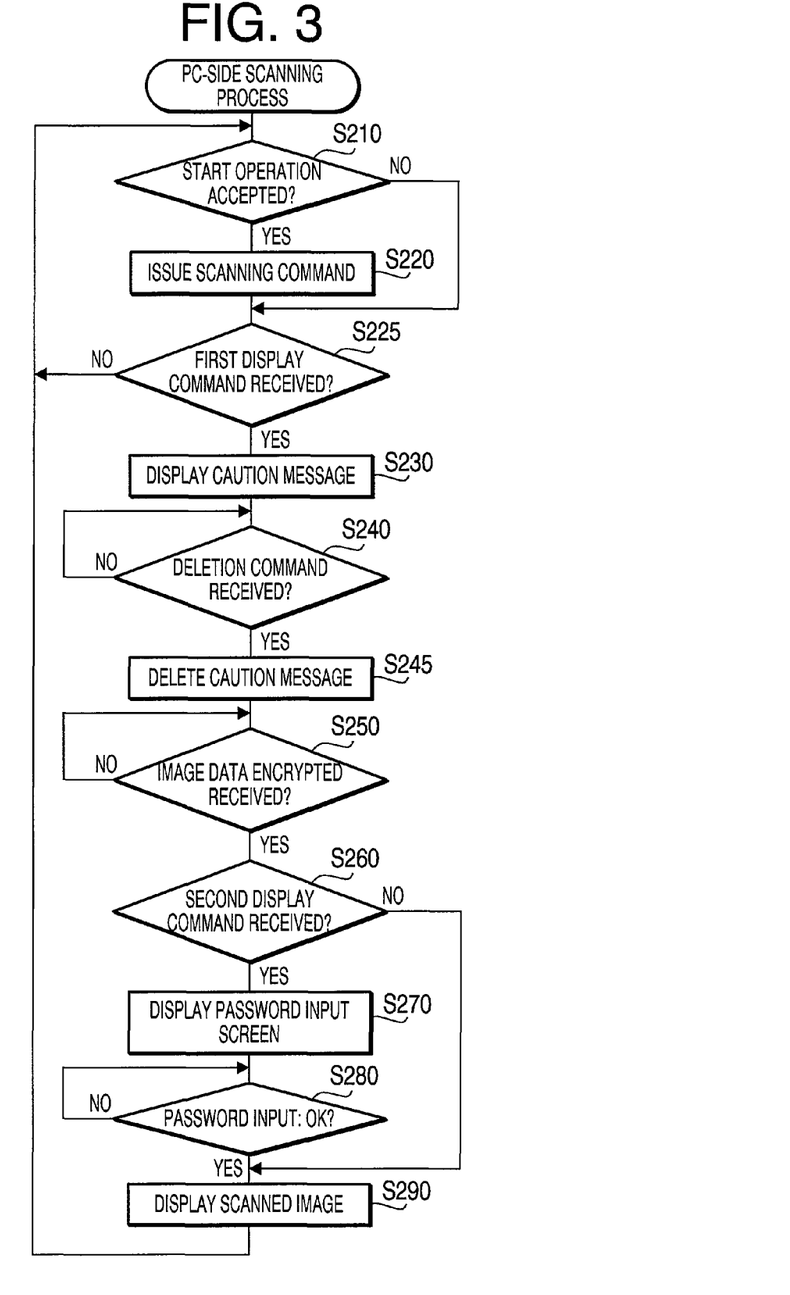
FIG. 3 is a flowchart showing a detailed procedure of a PC-side scanning process to be executed by a controller of a PC in the embodiment according to one or more aspects of the present invention.

FIG. 3 is a flowchart showing a detailed procedure of the PC-side scanning process to be executed by the controller 14 (more specifically, by the CPU of the controller 14). It is noted that the process is started when the image processing application is booted, and then repeatedly performed.

As illustrated in FIG. 3, when the process is launched, the controller 14 first determines in S210 whether a user operation to start image scanning (start operation) is accepted through the operation unit 11 (S210). When the start operation is accepted through the operation unit 11 (S210: Yes), the controller 14 advances to S220. Meanwhile, when the start operation is not accepted through the operation unit 11 (S210: No), the controller 14 goes to S225.

In S220, the controller 14 issues a predetermined scanning command to make the MFP 10 start image scanning to the MFP 10 via the network I/F 12 (S220). Then, the controller 14 proceeds to S225, in which the controller 14 determines whether the first display command is received from the MFP 10 via the network I/F 12 (S225). When the first display command is received from the MFP 10 via the network I/F 12 (S225: Yes), the controller 14 advances to S230. Meanwhile, when the first display command is not received from the MFP 10 via the network I/F 12 (S225: No), the controller 14 goes back to S210.

Figure 4B:
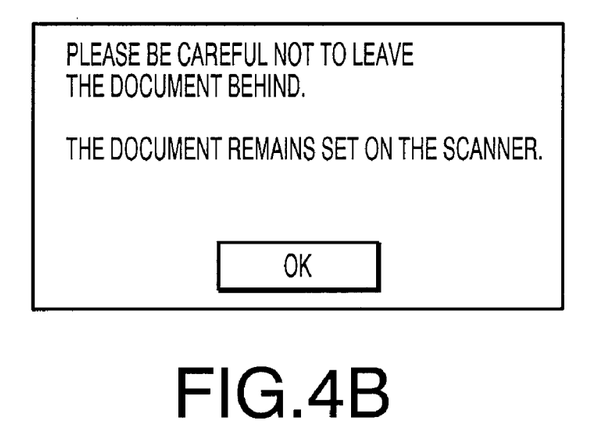
FIG. 4B exemplifies a caution message (a PC-side message) displayed at the side of the PC in the embodiment according to one or more aspects of the present invention.

In S230, as illustrated in FIG. 4B, the controller 14 displays, on the display unit 13 of the PC 20, the caution message (the PC-side message) to call user's attention for preventing the document from being left behind on the document table 2a in response to the first display command received in S225 (S230).

In a subsequent step S240, the controller 14 determines whether the deletion command is received from the MFP 10 via the network I/F 12 (S240). When the deletion command is received from the MFP 10 via the network I/F 12 (S240: Yes), the controller 14 advances to S245. Meanwhile, when the deletion command is not received from the MFP 10 via the network I/F 12, namely, when the document remains placed on the document table 2a of the MFP 10 (S240: No), the controller 14 waits the deletion command to be received from the MFP 10.

In S245, according to the deletion command received in S240, the controller 14 deletes the PC-side message displayed on the display unit 13 (S245). In a subsequent step S250, the controller 14 determines whether the image data (or the encrypted data) is received from the MFP 10 via the network I/F 12 (S250). When the image data (or the encrypted data) is received from the MFP 10 (S250: Yes), the controller 14 advances to S260. Meanwhile, when the image data (or the encrypted data) is not received from the MFP 10 (S250: No), the controller 14 waits the image data (or the encrypted data) to be received.

In S260, the controller 14 determines whether the second display command is received from the MFP 10 via the network I/F 12 (S260). When the second display command is received from the MFP 10, namely, when the encrypted data is received in S250 (S260: Yes), the controller 14 proceeds to S270. Meanwhile, when the second display command is not received from the MFP 10, namely, when the image data is received in S250 (S260: No), the controller 14 goes to S290.

Figure 4C:
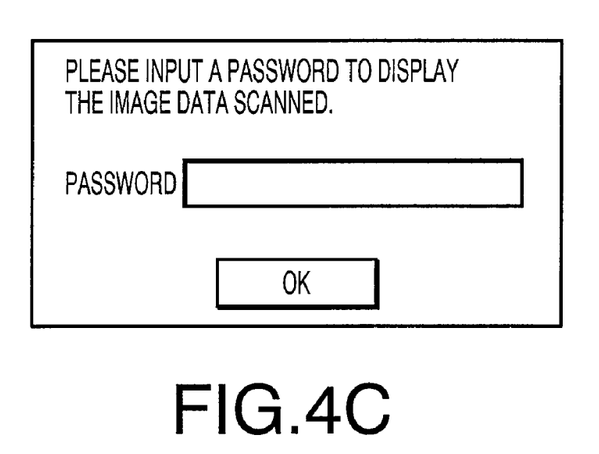
FIG. 4C exemplifies an input screen for inputting a password therethrough displayed at the side of the PC in the embodiment according to one or more aspects of the present invention.

In S270, as illustrated in FIG. 4C, the controller 14 displays on the display unit 13 the input screen for inputting therethrough a password in accordance with the second display command received in S260 (S270). Then, the controller 14 advances to S280, in which the controller 14 determines whether the password input through the operation unit 11 corresponds to the password contained in the encrypted data received in S250 (S280). When the password input through the operation unit 11 corresponds to the password contained in the encrypted data received in S250 (S280: Yes), the controller 14 decrypts the encrypted image data, and advances to S290. Meanwhile, when the password input through the operation unit 11 does not correspond to the password contained in the encrypted data received in S250 (S280: No), the controller 14 displays error information on the display unit 13 and waits the right password to be input.

In S290, the controller 14 displays on the display unit 13 the scanned image based on the image data (or the encrypted data) input in S250. Thereafter, the controller 14 goes back to S210.

<Operation>

Figure 5A:
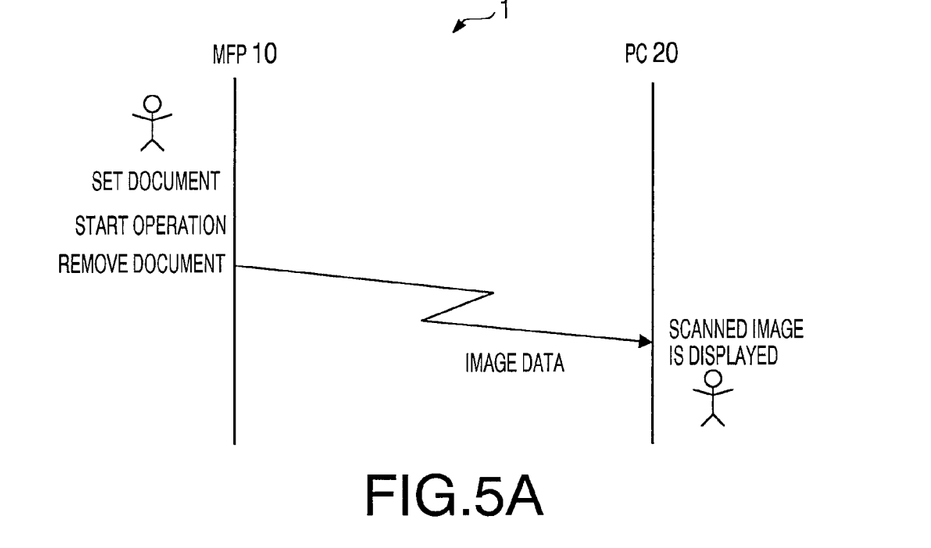
FIGS. 5A and 5B are first sequence diagrams to illustrate operations in the image processing system in the embodiment according to one or more aspects of the present invention.
Figure 5B:
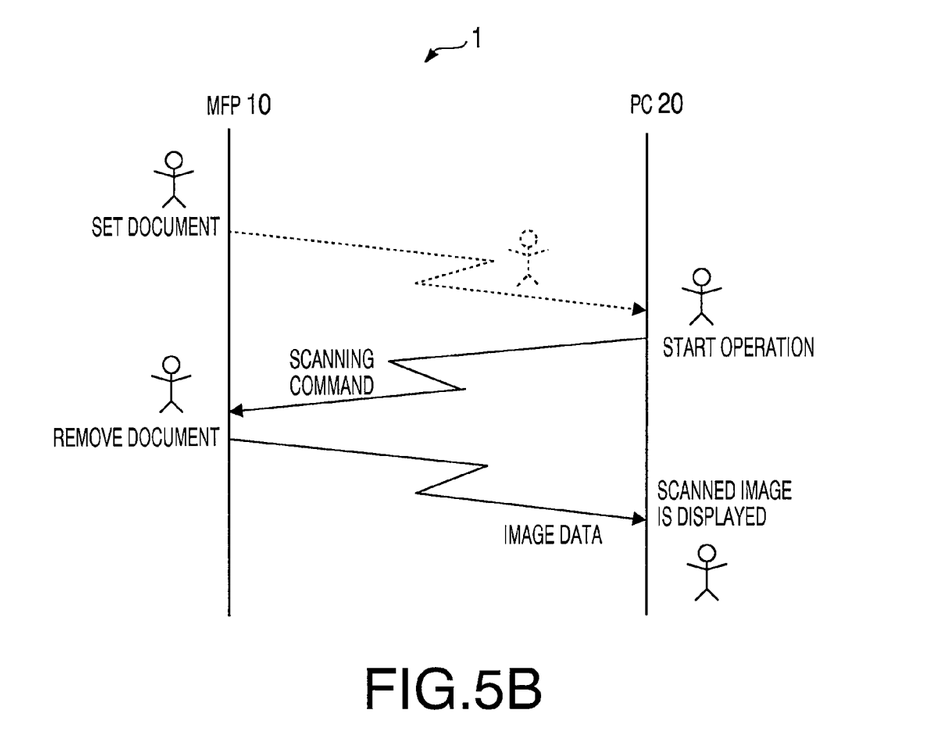

In the image processing system 1 configured as above, as illustrated in FIG. 5A, the user first sets the document to be scanned on the document table 2a of the MFP 10 in the state where the image processing application is booted, and then performs the start operation to start image scanning. Next, the user removes the document from the document table 2a of the MFP 10, and then returns to the PC 20. Alternatively, as illustrated in FIG. 5B, the user first sets the document to be scanned on the document table 2a of the MFP 10, and then moves to the PC 20. Subsequently, at the side of the PC 20, the user performs the start operation to start image scanning with the image processing application being booted, and then moves to the MFP 10. Finally, the user removes the document from the document table 2a of the MFP, and then returns to the side of the PC 20.

Namely, in the operations as shown in FIG. 5A, in the image processing system 1, when the user performs the start operation at the side of the MFP 10, the MFP 10 transmits, to the PC 20, the image (image data) scanned in the MFP-side scanning process. When the PC 20 receives the image data, a so-called push scan function is achieved to display the scanned image based on the image data received.

Further, in the operations as shown in FIG. 5B, in the image processing system 1, when the user performs the start operation at the side of the PC 20, the PC 20 transmits the scanning command to the MFP 10 in the PC-side scanning process. When receiving the scanning command, the MFP 20 transmits, to the PC 20, the image (image data) scanned in the MFP-side scanning process. When the PC 20 receives the image data, a so-called pull scan function is achieved to display the scanned image based on the image data received.

Here, in the image processing system 1, unless the document is removed from the MFP 10 by the user, the image data is not transmitted to the PC 20 in the MFP-side scanning process executed by the MFP 10, and a caution message is displayed on the MFP 10. In addition, a caution message is displayed on the PC 20 in the PC-side scanning process executed by the PC 20 as well.

Figure 6A:
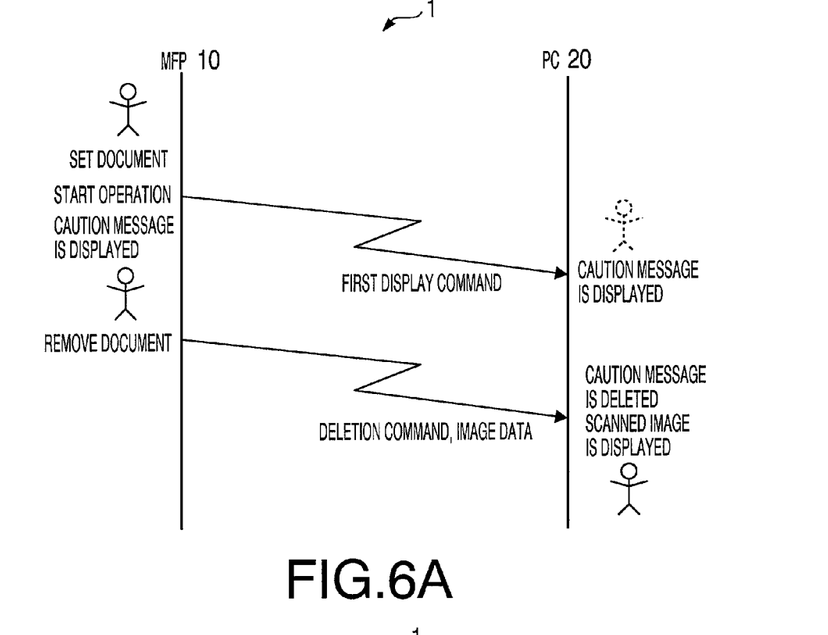
FIGS. 6A and 6B are second sequence diagrams to illustrate operations in the image processing system in the embodiment according to one or more aspects of the present invention.

Namely, in the image processing system 1, as illustrated in FIG. 6A, when image data is created by the MFP 10, the MFP 10 displays the MFP-side message in the MFP-side scanning process, and transmits the first display command to the PC 20. Further, when the PC 20 receives the first display command, the PC-side message is displayed. Thereby, even though the user does not become aware, at the side of the MFP 10, of the document left behind at the MFP 10, the user becomes aware of it at the side of the PC 20.

Additionally, in the image processing system 1, when the user becomes aware of the document left behind at the MFP 10 and removes the document from the MFP 10, the MFP 10 transmits the deletion command and the image data to the PC 20 in the MFP-side scanning process. When the PC 20 receives the deletion command, the caution message displayed on the PC 20 is deleted, and the scanned image is displayed.

Figure 6B:
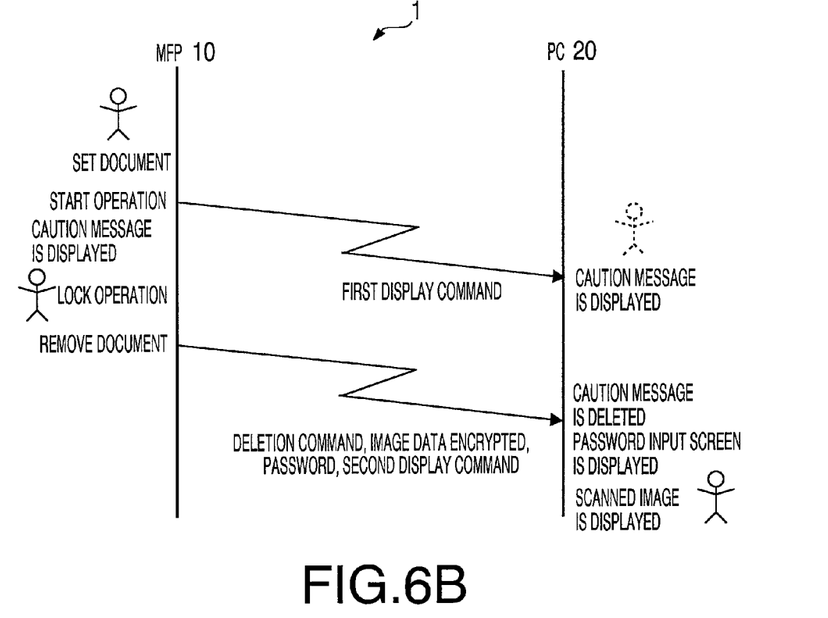

Alternatively, in the image processing system 1, as illustrated in FIG. 6B, when an image to be scanned contains confidential information, the lock operation is accepted by the time the MFP 10 transmits the image data. The MFP 10 transmits, to the PC 20, the deletion command, the image data encrypted, the password, and the second display command in the MFP-side scanning process. Then, when the PC 20 receives the deletion command, the image data encrypted, the password, and the second display command, the caution message displayed on the PC 20 is deleted, and the input screen for inputting therethrough a password is displayed. When the right password is input at the PC 20, the scanned image is displayed on the PC 20.

<Effects of Embodiment>

As described above, in the image processing system 1 of the embodiment, when the image on the document is scanned at the side of the MFP 10, as long as the document is not removed from the document table 2a, the image data is not transmitted to the PC 20. Therefore, the scanned image based on the image data is not displayed on the PC 20. In such a situation, it is impossible to perform operations (application operations) such as editing and saving the image data.

Hence, according to the image processing system 1 of the embodiment, when the user attempts to perform the application operations for the image data on the PC 20 without being aware of the document left behind at the MFP 10, as the user cannot perform the application operations, the user becomes aware of the document left at the MFP 10. Thus, it is possible to prevent the document from remaining left at the MFP 10.

Further, in the image processing system 1, when the image data is created by the MFP 10, each of the MFP 10 and the PC 20 displays thereon the caution message to call user's attention for preventing the document from being left behind at the MFP 10. Therefore, even though the user does not become aware, at the side of the MFP 10, of the document left behind at the MFP 10, the user becomes aware of it at the side of the PC 20. Thus, it is further possible to prevent the document from remaining left at the MFP 10.

Additionally, in the image processing system 1, when the lock operation is accepted by the MFP 10 by the time the image data is transmitted by the MFP 10, the scanned image is not displayed on the PC 20 as long as the right password is not input at the side of the PC 20. Therefore, it is possible to reduce a risk that a third party might take a look at the scanned image while the user is returning to the PC 20 from the MFP 10. Thus, it is possible to prevent confidential information contained in the scanned image from leaking to the third party.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the aforementioned embodiment, in the MFP-side scanning process, when the open-close switch 2c detects that the document cover 2b is set to the opened state from the closed state, the document is regarded to be removed from the document table 2a. However, a known optical sensor may be provided to directly detect that the document is removed from the document table 2a.

Furthermore, for example, the image scanning unit 2 may be provided with an Automatic Document Feeder (ADF). In this case, the image scanning unit 2 may be configured to monitor a catch tray onto which a scanned document is ejected and detect that the ejected document is removed, with the known optical sensor.

In the image processing system 1 of the aforementioned embodiment, the MFP 10 and the PC 20 are interconnected via the LAN. However, the MFP 10 and the PC 20 may be interconnected via a cable such as a USB cable or via the Internet.

In the aforementioned embodiment, the image processing system 1 is configured to achieve the push scan function and the pull scan function. However, the image processing system 1 may be configured to only achieve a scan function for transmitting to the PC 20 image data scanned by the MFP 10.

What is claimed is:

1. An image processing system, comprising:
an information processing device configured to externally receive image data and display thereon an image based on the image data; and
an image scanner connected with the information processing device,
wherein the image scanner comprises:
a scanning unit configured to scan an image on a document set thereon and to create image data of the scanned image;
a detector configured to detect whether the document is removed from the scanning unit; and
a controller configured to:
transmit, to the information processing device, a first display command to make the information processing device display a message to prevent the document from being left behind on the scanning unit,
in response to the detector detecting that the document is removed from the scanning unit after the first display command is transmitted, transmit to the information processing device a deletion command to delete the message displayed on the information processing device, and
in response to the detector detecting that the document is removed from the scanning unit after the image on the document is scanned by the scanning unit, transmit the image data created by the scanning unit to the information processing device.

2. The image processing system according to claim 1,
wherein the image scanner further comprises a document table configured such that the document to be scanned is set thereon and a cover configured to be set to any one of an opened state and a closed state and to protect the document table from being exposed to external light in the closed state, and
wherein the detector is configured to detect that the document is removed from the document table, when the cover is set to the opened state from the closed state.

3. The image processing system according to claim 1,
wherein the image scanner further comprises an acceptor configured to accept an operation to restrict the information processing device to display the scanned image based on the image data transmitted by the controller, and
wherein the controller is further configured to, in response to the detector detecting that the document is removed from the scanning unit after the operation is accepted through the acceptor, encrypt the created image data and transmit the encrypted image data to the information processing device.

4. The image processing system according to claim 3,
wherein the controller is further configured to transmit a password for decrypting the encrypted image data to the information processing device along with the image data encrypted.

5. The image processing system according to claim 4,
wherein the image scanner further comprises a display unit configured to display the password for decrypting the encrypted image data, and
wherein the controller is further configured to transmit a second display command to make the information processing device display an input screen for inputting the password therethrough, to the information processing device along with the encrypted image data and the password.

6. The image processing system according to claim 1,
wherein the controller is further configured to, while the detector is detecting that the document remains on the scanning unit even after the image on the document is scanned by the scanning unit, forbid transmitting the image data created by the scanning unit to the information processing device.

7. An image scanner connectable with an information processing device, comprising:
a scanning unit configured to scan an image on a document set thereon and to create image data of the scanned image;
a detector configured to detect whether the document is removed from the scanning unit; and
a controller configured to:
transmit, to the information processing device, a first display command to make the information processing device display a message to prevent the document from being left behind on the scanning unit,
in response to the detector detecting that the document is removed from the scanning unit after the first display command is transmitted, transmit to the information processing device a deletion command to delete the message displayed on the information processing device, and in response to the detector detecting that the document is removed from the scanning unit after the image on the document is scanned by the scanning unit, transmit the image data created by the scanning unit to the information processing device.

8. The image scanner according to claim 7, further comprising:
a document table configured such that the document to be scanned is set thereon; and
a cover configured to be set to any one of an opened state and a closed state and to protect the document table from being exposed to external light in the closed state,
wherein the detector is configured to detect that the document is removed from the document table, when the cover is set to the opened state from the closed state.

9. The image scanner according to claim 7, further comprising an acceptor configured to accept an operation to restrict the information processing device to display the scanned image based on the image data transmitted by the controller,
wherein the controller is further configured to, in response to the detector detecting that the document is removed from the scanning unit after the operation is accepted through the acceptor, encrypt the created image data and transmit the encrypted image data to the information processing device.

10. The image scanner according to claim 9,
wherein the controller is further configured to transmit a password for decrypting the encrypted image data to the information processing device along with the image data encrypted.

11. The image scanner according to claim 10, further comprising a display unit configured to display the password for decrypting the encrypted image data, and
wherein the controller is further configured to transmit a second display command to make the information processing device display an input screen for inputting the password therethrough to the information processing device along with the encrypted image data and the password.

12. The image scanner according to claim 7,
wherein the controller is further configured to, while the detector is detecting that the document remains on the scanning unit even after the image on the document is scanned by the scanning unit, forbid transmitting the image data created by the scanning unit to the information processing device.

13. An image scanner connectable with an image processing device, comprising:
a scanning unit configured to scan an image on a document set thereon and to create image data of the scanned image;
a detector configured to detect whether the document remains on the scanning unit; and
a controller configured to:
transmit, to the information processing device, a first display command to make the information processing device display a message to prevent the document from being left behind on the scanning unit,
in response to the detector detecting that the document is removed from the scanning unit after the first display command is transmitted, transmit to the information processing device a deletion command to delete the message displayed on the information processing device, and
while the detector is detecting that the document remains on the scanning unit even after the image on the document is scanned by the scanning unit, forbid transmitting the image data created by the scanning unit to the information processing device.

* * * * *